United States Patent Office 3,457,191
Patented July 22, 1969

3,457,191
METHOD OF PREPARING CRYSTALLINE ALUMINOSILICATE CATALYTIC COMPOSITES
Henry Erickson, Park Forest, Ill., and Howard G. Russell, Munster, Ind., assignors to Sinclair Research, Inc., New York, N.Y., a corporation of Delaware
No Drawing. Filed Mar. 1, 1967, Ser. No. 619,586
Int. Cl. B01j 11/40
U.S. Cl. 252—455
15 Claims

ABSTRACT OF THE DISCLOSURE

Preparation of ammonium-exchanged crystalline aluminosilicate-containing catalytic contact material is improved by first preparing an aqueous mixture of sodium aluminosilicate (e.g., at least about 5% Na) with one or more metal oxides (e.g., silica-alumina), drying the mixture, partially exchanging the sodium content with ammonium hydroxide having a pH of at least about 8.5, and further exchanging with ammonium nitrate solution.

---

This invention relates to an improved method of preparing crystalline aluminosilicate-containing catalytic contact materials. More particularly, the invention concerns an improvement in the method of exchanging ammonium ions for sodium ions in the preparation of catalysts containing crystalline aluminosilicate and one or more metal oxides.

Crystalline aluminosilicate-containing catalysts can be used in hydrocarbon cracking and other chemical conversion operations. It is advisable, however, at some time during the preparation to effect replacement of the alkali metal ions with other, beneficial cations such as rare earth or other metal ions, hydrogen ions, etc. Hydrogen ion exchange of at least a portion of the sodium is often preferred. Such hydrogen ion replacement is usually effected indirectly, that is by initial exchange of the sodium with ammonium ions which latter ions decompose during calcination to release ammonia and leave an acid (hydrogen) site on the aluminosilicate. The ammonium exchange has been variously conducted, for example, by contact of the aluminosilicate with an aqueous solution of ammonium chloride or another water-soluble ammonium compound. The exchange agents heretofore preferred, and most commonly used, have been aqueous solutions of ammonium salts, while ammonium hydroxide, a more desired exchange agent, has not been particularly effective in producing good catalysts.

Most often such as exchange has been conducted prior to mixing the aluminosilicate with, for instance, amorphous silica-alumnia (e.g., in the hydrogel form) and any additional material to be included, as, for example, hydrous alumina. Alone, the preliminary exchange has often been found, however, to be insufficient to hold the sodium level of the finished catalyst within desired limits; the reason, in part, being that the later added materials—such as silica-alumina hydrogel, hydrous alumina, etc.—usually contain significant amounts of sodium ions themselves, which are thus contributed to the composite. Consequently, in addition to the pre-exchange of the aluminosilicate, it has usually been necessary, in order to obtain finished catalysts sufficiently low in sodium, to effect further ammonium ion exchange of the composite mixture, via several additional washings with solutions of ammonium salts prior to final drying. The necessity of plural exchange steps and several washings reflects itself in the cost of the final catalyst.

The improvement of the present invention has been found to provide a less costly, more efficient method of preparing ammonium ion-exchanged, crystalline aluminosilicate-containing catalyst precursors. In accordance with the method of the present invention, there is no necessity for the costly pre-exchange of sodium aluminosilicate; rather, by postponing the exchange step until the crystalline sodium aluminosilicate is admixed with one or more metal oxides, e.g. amorphous silica-alumina hydrogel, and then drying and washing with relatively high pH ammonium hydroxide, followed by washing with an aqueous ammonium nitrate solution, a contact material having a low sodium content is obtained which equals or surpasses in catalytic activity that produced by prior art plural exchange methods. An additional advantage of the present method is that the sulfate or other acid anion level of the material can be reduced to a very low value, e.g., below about 0.5%.

The improved ammonium exchange method of the present invention thus comprises the following steps:

(i) Preparing an aqueous mixture of one or more metal oxides, preferably in hydrogel form, for instance, synthetic, amorphous silica-alumina hydrogel, and a crystalline sodium aluminosilicate, the crystalline aluminosilicate component having a sodium content of, for instance, at least about 8, often about 10 to 15, weight percent; although the crystalline aluminosilicate can be ammonium-exchanged to as low as about 5% sodium before combination with the metal oxide, this is not preferred; the aqueous mixture generally has at least about 8 weight percent sodium;

(ii) Drying the mixed metal oxide-crystalline aluminosilicate to remove free water, which action will convert the hydrogel to xerogel, spray drying being especially advantageous and it being preferred to concentrate the solids, e.g. by filtering, before drying;

(iii) Washing the dried mixture with sufficient aqueous ammonium hydroxide having a pH of at least about 8.5, preferably about 9 to 11, to lower the total sodium content of the mixed metal oxide-crystalline aluminosilicate by at least about 70 weight percent, preferably by about 80 to 90 weight percent, based on dried solids; preferably before this washing the dried material from step (ii) is water washed and filtered; and (iv) Washing the resulting mixture with sufficient aqueous ammonium nitrate solution to lower the sodium content of the mixture, generally by at least about 100 p.p.m., to obtain a product having below about 200 p.p.m. sodium, preferably less than about 150 p.p.m., per each percent of crystalline aluminosilicate present. This sodium content and all others herein are on the basis of dried solids.

The ammonium ion-exchanged mixture of catalyst precursor ingredients can then be dried, for instance at temperatures of about 230 to 600° F., which temperatures are also suitable for the drying before the ammonium hydroxide wash. The dried material can be calcined, for instance at a temperature of the order of about 700–1500° F., preferably about 800–1100° F., to provide an active catalyst. The calcination may take place in the system designed to use the catalyst, e.g., in the catalyst regenerator of a commercial hydrocarbon cracking unit.

The crystalline sodium aluminosilicate employed in the method of the present invention, whether synthetic or naturally-occurring, preferably has a pore size in the range of 8–15 A., and more preferably the pores have a size in the range of 10–14 A. Usually, with a given material, the pores are relatively uniform in size and often the crystalline aluminosilicate particles are primarily less than about 15 microns in size, preferably less than about 2 microns. The silica-to-alumina mole ratio in the aluminosilicate is preferably at least about 2:1 and is usually not above about 12:1, advantageously being about 4 to 6:1.

The mixture subjected to washing with aqueous ammonium hydroxide in this invention contains about 1 to 90, preferably about 3 to 60, weight percent of the crystalline aluminosilicate, based on solids content, and about 10 to 99, preferably about 40 to 97, weight percent of one or more metal oxides. These amounts are calculated on the basis of dried solids. The metal oxides which can be employed include, for instance, silica, alumina, magnesia, zirconia, thoria, clays, titania or combinations thereof, which oxides may be amorphous. The oxides most often used are those of the metals of Groups II–A, III and IV–A of the Periodic Chart, and plural gels of more than one of these metal oxides are frequently employed, especially combinations predominating in silica and containing at least about 5 weight percent of another metal oxide which gives an acidic, silica-based mixture. The composite of crystalline aluminosilicate and metal oxide may contain other materials, including boria, or other non-metal oxides, etc. The composites may also have incorporated therein, for instance, either by impregnation or ion exchange, one or more catalytically-active promotors such as those which enhance hydrogenation, e.g. the Groups VI and VIII metals. Quite often the metal oxide component combined with the crystalline aluminosilicate contains an inorganic acid anion, e.g. chloride, sulfate or nitrate, which appears to enhance the results obtained by the method of this invention.

When silica-alumina is present in the composite of the present invention, this plural metal oxide is preferably a synthetically-precipitated, amorphous, silica-alumina hydrogel which contains about 55–90, often about 65–75, weight percent silica and preferably about 10–45, often about 25–35, weight percent alumina, on a dry basis. The silica-alumina hydrogel can be prepared by any desired method, and several procedures are known in the art. For instance, the amorphous hydrogel can be prepared by coprecipitation or by sequential precipitation with either component being initially precipitated. Often, for example, a silica hydrogel is first made by precipitation from an alkali metal silicate solution using an acid such as sulfuric acid. Alum solution may then be added to the silica hydrogel slurry and alumina precipitated by raising the pH into the alkaline range. The pH adjustment may be made, for instance, by the addition of an aqueous sodium aluminate solution or by the addition of a base such as ammonium hydroxide. Other techniques for preparing the silica-alumina hydrogel are well known in the art, and these techniques may be used in the practice of the invention.

In a preferred embodiment of the invention hydrous alumina is also included in the aqueous mixture of silica-alumina hydrogel and crystalline sodium alumino-silicate. The alumina hydrogel, if added, can be made separately from the silica-alumina hydrogel. The alumina hydrogel may be prepared, for example, by precipitation of alumina at alkaline pH by mixing alum and sodium aluminate in an aqueous solution or with a base such as soda ash, ammonia, etc. The alumina hydrogel is preferably in the form of amorphous hydrous alumina or alumina monohydrate of up to about 50 A. crystallite size as determined by X-ray diffraction analysis. The amorphous hydrous alumina generally contains as much combined water as an alumina monohydrate. Mixtures of the monohydrate and amorphous forms of hydrous alumina are most preferred and often this phase is composed of at least about 25% of each of the separate members.

In preparing the mixture to be ammonium-exchanged, it is preferred to separately filter the plural metal oxide hydrogel and any hydrous alumina to be included and intimately mix these materials, for instance by colloidal milling. Although in this and other methods of preparation the crystalline sodium aluminosilicate is preferably added to the metal oxide before the milling, this ingredient may also be combined after the colloidal milling operation.

An often preferred aqueous mixture to be ammonium ion-exchanged is one having, based on total dried solids content, about 45–90, preferably about 75–90, weight percent of amorphous silica-alumina hydrogel, about 5–50, preferably about 10–25, weight percent of hydrous alumina, and about 1–50, preferably about 5–20, weight percent of the crystalline sodium aluminosilicate, the total alumina content of the mixture (from said silica-alumina hydrogel and said hydrous alumina) being about 20–60, preferably about 25–50, weight percent.

The washing of the dried aqueous mixture of catalyst precursors with the high pH ammonium hydroxide solution can be conducted using known techniques and equipment. This washing step may require a series of alternating ammonium hydroxide and water washes in order to lower the sodium level by at least about 70 weight percent. While room temperature is suitable for conducting the ammonium hydroxide washing, advantageously, elevated temperatures, often in the range of about 100 to 150° F., are employed.

After washing the crystalline aluminosilicate-metal oxide mixture with sufficient, high pH amomnium hydroxide to lower the sodium content to the desired level, the ammonium exchange is continued, using ammonium nitrate as the exchange agent. Often, only a single aqueous ammonium nitrate wash will be required to bring the sodium concentration within the desired range, i.e., less than about 200 p.p.m., perferably below about 150 p.p.m., for each percent of crystalline aluminosilicate present; but more than one ammonium nitrate contact may be used and, if desired, with an intermediate water wash. It is indeed surprising that in the method of this invention ammonium hydroxide can be so effectively used in conjunction with a relatively small requirement of ammonium nitrate, since heretofore ammonium hydroxide has not been employed with any particular degree of success when trying to obtain composites of crystalline aluminosilicate of low sodium content. Analyses indicate that essentially all of the sodium present in the final mixture is retained on the crystalline aluminosilicate essentially all of the sodium which may have been introduced with, for instance, the amorphous silica-alumina hydrogel or the hydrous alumina, if present, will have been exchanged for ammonium ions. The aqueous ammonium nitrate solution used in the final exchange washing is preferably at a pH of about 4 to 6.5. Elevated temperatures, e.g., about 120 to 210° F., are preferably employed for the ammonium nitrate wash.

The invention may be better understood by reference to the following non-limiting examples.

Example I

An alumina hydrogel is prepared as follows:

In a tank containing 5700 gallons of water at 85° F., are dissolved 300 pounds of soda ash. When the soda ash has been dissolved, 180 gallons of a 39% concentration aqueous sodium aluminate solution are pumped into the tank in about a 15 minute period. The contents of the tank are at about 84° F. Six hundred gallons of aqueous aluminum sulfate of 7.8% concentration, calculated as $Al_2O_3$, are added to the admixture over an 80 minute period with water of dilution in conjunction with, and in addition thereto, diluting the reaction mass at a rate of 25 gallons per minute.

The pH of the resulting aqueous reaction mass is adjusted to 8.0 with about 75 gallons of 39% concentration, aqueous sodium aluminate solution which, while being added, is also diluted continuously with water at a rate of 35 gallons per minute over a 7½ minute addition period. The contents of the tank are heated to about 100° F., and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet alumina hyrogel is stripped from the drum. This hydrogel analyzes about 50% boehmite, having a crystallite size of about 35 A., and 50% amorphous hydrous alumina, as determined by X-ray diffraction on dried samples.

Example II

A silica-alumina hydrogel is prepared by the following technique:

To a batch tank is added 4,275 gallons of water preheated to 90° F., and 865 gallons of sodium silicate solution (28.8 weight percent $SiO_2$, 40–41.5 Baumé at 68° F. and $Na_2O:SiO_2$ ratio of 1:3.2) is added. The batch is stirred for five minutes. The concentration of the sodium silicate, calculated as $SiO_2$, in the batch is 6.3 weight percent.

With the batch at 90° F., 302 gallons of 34.5 weight percent sulfuric acid solution at 182° F. is added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes, whereupon 205 gallons of sodium aluminate solution (24.4 weight percent as $Al_2O_3$) diluted in 1080 gallons of water is added over a period of 17 minutes. After all the sodium aluminate is added, the pH is checked. It should be between 5.0 and 5.2. The alumina content of the silica-alumina hydrogel is 30–31%.

Example III

The silica-alumina hydrogel product of Example II and 1740 gallons of the alumina hydrogel filter cake of Example I are mixed together for one hour. The finished batch has a pH of 5.5 to 5.6, a temperature of about 110° F., and about 10% sodium, based on dried solids.

Example IV

To 950 gallons of a mixture of alumina and silica-alumina hydrogels prepared in the manner described in Example III, containing 532 pounds of solids, were added 77 pounds of a filter cake of ammonium-exchanged (1.1% Na) crystalline aluminosilicate having a silica to alumina mole ratio of about 4.5:1 and a pore size of about 13 A., equivalent to 28 pounds of H-aluminosilicate. The alumino-silicate-containing hydrogel mixture was passed through a colloid mill, filtered, and spray dried. The dried composite was slurried with water and filtered three times, followed by two 8.0 pH ammonium hydroxide washes and filtrations. Displacement washing was utilized during each filtration. The washed solids were reslurried in water, at about 10% solids content, with 25 pounds of ammonium nitrate and heated with live steam to 170–180° F. for two hours. The slurry was then filtered and washed. A second exchange was made in the same manner, except that a higher catalyst solids contents (about 25%) was employed. A quantity of the resultant material, designated Catalyst D, was oven dried at 230° F. and tested as shown in Table I.

Example V

A batch of mixed alumina and silica-alumina hydrogels was prepared as in Example III. To 845 gallons thereof, containing 475 pounds of solids, were added 66 pounds of a filter cake of unexchanged (10.6% Na) crystalline aluminosilicate having a silica to alumina mole ratio of about 4.5 to 1 and a pore size of about 13 A., providing about 28 pounds of Na-aluminosilicate, equivalent to 25 pounds of H-aluminosilicate. The material was thoroughly mixed, passed through a colloid mill, filtered (7.05% Na, ignited basis) and spray dried. The dried composite was reslurried with water, filtered and washed, and had about 1% Na, ignited basis. A 500-gram portion of the solids was washed in the following manner: Each wash step consisted of slurring with hot water, or water plus ammonia, at 25% solids content, filtering and water rinsing on the filter. The sample was given a series of alternating water and ammonium hydroxide washes totaling 4 ammonium hydroxide washes (using 4.4% $NH_3$) and 7 water washes. Temperatures of 100–150° F. were used. The pH of the ammonium hydroxide washing solutions was about 9.

The sodium content of the material at this point was 0.138%, or 1380 p.p.m. The sodium content of the 5.6% unexchanged crystalline aluminosilicate added was 10.6%; therefore, calculated sodium contributed by the crystalline aluminosilicate would be about 0.6%. Thus, it is obvious that the high pH ammonia washing had exchanged most of the sodium introduced to the mixture by the crystalline aluminosilicate. This is unusual in view of the difficulty commonly found in ammonium-exchanged sodium aluminosilicates with ammonium hydroxide.

500 grams of the ammonia-washed material was reslurried with water at 25% solids; 34.5 grams of ammonium nitrate was added, the slurry heated with mixing to 170° F. for two hours, filtered, and rinsed with water. A second exchange was carried out using 54 grams of $NH_4NO_3$. The oven dried product had 790 p.p.m. Na and was designated Catalyst E.

Example VI

A batch of mixed hydrogels containing 2.7 tons of catalyst precursor solids was prepared in the manner described in Example III. 330 pounds of the same unexchanged crystalline aluminosilicate as used in Example V (10.6% Na) was added to the hydrogel mixture. The mixture was pumped through a colloid mill, filtered, again colloidized and spray dried. Dried microspheres were reslurried with water and washed on a filter. The material was reslurried with ammonium hydroxide having a pH of 8.5 to 9.5, filtered and washed. The material was again reslurried with ammonium hydroxide, this time at a pH of 9.5 to 10.5, filtered and washed to a Na content of about 1530 p.p.m. The filter cake was reslurried in an aqueous solution containing 260 pounds of $NH_4NO_3$ per ton of catalyst, and the slurry held at 170–190° F. for a period of about 2 hours, filtered, and washed on the filter. The product was exchanged a second time in the same manner. After the second exchange the material was filtered, washed, flash dried, and designated Catalyst F.

Example VII

Catalyst G was prepared in a manner analogous to that of Catalyst E, Example V, except that the separate alumina phase was not included in the silica-alumina hydrogel.

In Table I are compared the activities of Catalysts D, E, F and G in the cracking of light gas oil. Run conditions are as follows:

Temperature, ° F. _____ 900
Pressure _____ Atmospheric
Space velocity, WHSV _____ 2

Also reported are the performances of three commercial, crystalline aluminosilicate-containing, cracking catalysts, designated as Catalysts A, B and C, the identification of which are as follows:

Catalyst A: A cerium-exchanged crystalline aluminosilicate-containing cracking catalyst, the aluminosilicate having a silica-to-alumina mole ratio of about 2.5 to 1 and a pore size of about 13 A.

Catalyst B: A silica-alumina cracking catalyst containing about 15% of an ammonium-exchanged, crystalline aluminosilicate having a silica-to-alumina mole ratio to about 4.5 to 1 and a pore size of about 13 A.

Catalyst C: Another cerium-exchanged crystalline aluminosilicate-containing cracking catalyst, the aluminosilicate having a silica-to-alumina mole ratio of about 2.5 to 1 and a pore size of about 13 A.

TABLE

| Catalyst | A | B | C | D | E | F | G |
|---|---|---|---|---|---|---|---|
| Analysis: | | | | | | | |
| Percent $Al_2O_3$ | 45.5 | 12.1 | 32.0 | 45.8 | 46.1 | 43.5 | 23.6 |
| Percent $SO_4$ | 1.66 | 0.30 | 0.24 | 1.38 | 0.24 | | 0.24 |
| P.p.m. Na | 1,600 | 720 | 740 | 910 | 790 | 725 | 440 |
| $N_2$ area, m.$^2$/g | 181 | 587 | 375 | 505 | 458 | 518 | 505 |
| Total pore volume, cc./g | 0.38 | 0.89 | 0.745 | 0.86 | 0.87 | 0.96 | 0.735 |
| Test values: | | | | | | | |
| Relative activity | 59.0 | 126.5 | 112.0 | 125.5 | 132.0 | 123.0 | 165.0 |
| D+L | 43.0 | 61.7 | 58.5 | 61.5 | 62.5 | 61.0 | 68.0 |
| Gas factor | 0.91 | 0.82 | 0.83 | 0.85 | 0.80 | 0.88 | 0.89 |
| Coke factor | 0.93 | 0.82 | 0.93 | 1.00 | 0.87 | 0.96 | 0.93 |
| Gas gravity | 1.32 | 1.53 | 1.50 | 1.40 | 1.46 | 1.46 | 1.42 |
| Steamed 4 hrs. 1,400° F.: | | | | | | | |
| Relative activity | 27.7 | 39.6 | 73.5 | 111.0 | 81.2 | 86.5 | |
| D+L | 29.0 | 35.6 | 48.5 | 58.5 | 51.0 | 52.5 | |
| Gas factor | 1.04 | 0.73 | 0.52 | 0.60 | 0.67 | 0.64 | |
| Coke factor | 0.94 | 0.65 | 0.37 | 0.47 | 0.51 | 0.44 | |
| Gas gravity | 1.24 | 1.51 | 1.51 | 1.51 | 1.43 | 1.48 | |
| Steamed 6 hrs. 1,450° F.) | | | | | | | |
| Relative activity | | | | 55.0 | 56.5 | | 39.4 |
| D+L | | | | 42.0 | 42.5 | | 35.5 |
| Gas factor | | | | 0.70 | 0.71 | | 0.98 |
| Coke factor | | | | 0.49 | 0.50 | | 0.73 |
| Gas gravity | | | | 1.42 | 1.42 | | 1.30 |
| Calcined 3 hrs. 1,700° F.: | | | | | | | |
| Relative activity | 27.8 | 108.0 | 22.9 | 127.0 | 150.0 | 174.0 | |
| D+L | 29.0 | 58.0 | 25.6 | 61.8 | 65.5 | 69.2 | |
| Gas factor | 1.04 | 0.55 | 0.93 | 0.65 | 0.60 | 0.55 | |
| Coke factor | 1.08 | 0.50 | 0.97 | 0.68 | 0.60 | 0.52 | |
| Gas gravity | 1.17 | 1.53 | 1.31 | 1.44 | 1.47 | 1.51 | |
| $N_2$ area, m.$^2$/g | 60 | 155 | 58 | 236 | 234 | | |

The data of preceding table illustrate that the catalysts produced by the method of the present invention (especially Catalysts E and F), although they are prepared without resort to the costly pre-exchange step of the prior art, are substantially as effective as those resulting from the prior art plural exchange technique. In some respects, the present catalysts are even more efficient. Thus, for example, in the cracking test, Catalysts E, F and G exhibited lower coke factors and higher gas gravities than Catalyst D, prepared with pre-exchange crystalline aluminosilicate, and maintained these advantages even after calcination for 3 hours at 1700° F.

An additional advantage of the improved exchange procedure of the present invention is that the sulfate level of the catalyst composite is reduced to a very low value (less than 0.24%). Plural-exchanged Catalyst D, on the other hand, was relatively high in undesirable sulfate, containing 1.38% thereof.

What is claimed:
1. In the method of making a contact material by preparing an aqueous mixture comprising one or more metal oxides and ammonium-exchanged crystalline aluminosilicate, and thereafter drying the mixture, the improvement which comprises
   (i) preparing an aqueous mixture comprising one or more metal oxides and at least about 1 weight percent crystalline sodium aluminosilicate having a sodium content of at least about 5 weight percent, based on dry solids;
   (ii) drying the mixed metal oxide-crystalline aluminosilicate to remove free water;
   (iii) washing the dried mixture with sufficient aqueous ammonium hydroxide having a pH of at least about 8.5 to lower the total sodium content of the mixed metal oxide-crystalline aluminosilicate by at least about 70 weight percent; and
   (iv) washing the resulting mixture with sufficient aqueous ammonium nitrate solution to lower the total sodium content of the mixture to below about 200 p.p.m. per each percent of crystalline aluminosilicate present.

2. The improvement of claim 1 wherein the metal oxide is amorphous oxide of metals of Groups II–A, III, and IV–A of the Periodic Chart.

3. The improvement of claim 2 wherein (i) the aqueous mixture comprises about 40 to 97 percent of said amorphous metal oxide and about 3 to 60 percent of said crystalline sodium aluminosilicate, based on the weight of solids.

4. The improvement of claim 3 wherein in (i) the amorphous metal oxide is hydrogel predominating in silica and containig at least about 5 weight percent of other amorphous oxide of metals of Groups II–A, III, and IV–A of the Periodic Chart.

5. The improvement of claim 4 wherein in (i) the amorphous metal oxide contains inorganic acid anion.

6. In the method of making a contact material by preparing an aqueous mixture comprising synthetic, amorphous silica-alumina hydrogel and ammonium ion-exchanged crystalline aluminosilicate, and thereafter drying the mixture, the improvement in the mixture preparation step which comprises
   (i) preparing an aqueous mixture comprising synthetic amorphous silica-alumina hydrogel containing inorganic acid anion and at least about 3 weight percent crystalline sodium aluminosilicate having a sodium content of at least about 8 weight percent, based on dry solids;
   (ii) drying the mixed metal oxide-crystalline aluminosilicate to convert the hydrogel to xerogel;
   (iii) washing the dried mixture with sufficient aqueous ammonium hydroxide having a pH of at least about 8.5 to lower the total sodium content of the mixed metal oxide-crystalline aluminosilicate by about 80 to 90 weight percent; and
   (iv) washing the resulting mixture with sufficient aqueous ammonium nitrate solution to lower the sodium content of the mixture to below about 150 p.p.m. per each percent of crystalline aluminosilicate present.

7. The improvement of claim 6 wherein in (iii), the washing of the mixture with ammonium hydroxide, is conducted at a temperature of about 100 to 150° F.

8. The improvement of claim 7 wherein in (iv), the washing of the resulting mixture with ammonium nitrate solution, is conducted at a temperature of about 120 to 210° F.

9. The improvement of claim 8 wherein in (ii) the mixture is filtered before drying, and is water-washed and again filtered after drying.

10. The improvement of claim 6 wherein the pH of the ammonium nitrate solution is about 4.0 to 6.5.

11. The improvement of claim 6 wherein the aqueous mixture of hydrogel and aluminosilicate consists essentially of, based on total solids content, about 45–90 weight percent of synthetic, amorphous silica-alumina hydrogel, said silica-alumina consisting essentially of about 55–90 weight percent silica an dabout 10–45 weight percent alumina, about 5–50 weight percent hydrous alumina selected from the group consisting of amorphous hydrous alumina and alumina monohydrate having a crystallite size of up to about 50 A., and about 1–50 weight percent of a crystalline sodium aluminosilicate having a silica to alumina mole ratio of from greater than 2 to 12:1 and a pore size of 8–15 A., the total alumina content of said mixture from said silica-alumina hydrogel and said hydrous alumina being about 20–60 weight perecnt.

12. The improvement of claim 11 wherein the mole ratio of silica to alumina in said crystalline sodium aluminosolicate is about 4 to 6:1.

13. The improvement of claim 12 wherein the hydrous alumina is a mixture containing at least about 25 weight percent of each of amorphous hydrous alumina and alumina monohydrate having a crystallite size of up to about 50 A.

14. In the method of making a contact material by preparing an aqueous mixture comprising amorphous silica-alumina hydrogel and ammonium ion-exchanged crystalline aluminosilicate, and thereafter drying the mixture, the improvement in the mixture preparation step which comprises (i) preparing an aqueous mixture consisting essentially of, based on total solids content, about 45–90 weight percent of synthetic, amorphous silica-alumina hydrogel containing inorganic acid anion, said silica-alumina consisting essentially of about 55–90 weight percent silica and about 10–45 weight perecnt alumina; about 5–50 weight percent hydrous alumina selected from the group consisting of amorphous hydrous alumina and alumina monohydrate having a crystallite size of up to about 50 A.; and about 1–50 weight percent of a crystalline sodium aluminosilicate having a silica to alumina mole ratio of about 4 to 6:1, a pore size of 8–15 A., and a sodium content of about 10 to 15 weight percent; the total alumina content of said mixture from said silica-alumina hydrogel and said hydrous alumina being about 20–60 weight percent;

(ii) drying the mixed metal oxide-crystalline aluminosilicate to convert the hydrogel to xerogel;

(iii) washing the dried mixture at a temperature of about 100 to 150° F. with sufficient aqueous ammonium hydroxide having a pH of about 9 to 11 to lower the total sodium content of the mixed metal oxide-crystalline aluminosilicate by about 80 to 90 weight percent; and (iv) washing the resulting mixture at a temperature of about 120 to 210° F. with sufficient aqueous ammonium nitrate solution having a pH of about 4.0 to 6.5 to lower the sodium content of the mixture by at least about 100 p.p.m., to obtain a product having below about 150 p.p.m. sodium per each percent of crystalline aluminosilicate present.

15. The improvement of claim 4 wherein in (ii) the mixture is filtered before drying, and is water-washed and again filtered after drying.

References Cited

UNITED STATES PATENTS

| | | | |
|---|---|---|---|
| 3,140,249 | 7/1964 | Plank et al. | 252—455 X |
| 3,140,253 | 7/1964 | Plank et al. | 252—455 X |
| 3,287,282 | 11/1966 | Stiles | 252—455 |

EDWARD J. MEROS, Primary Examiner

PO-1050
(5/69)

UNITED STATES PATENT OFFICE
CERTIFICATE OF CORRECTION

Patent No. 3,457,191      Dated July 22, 1969

Inventor(s) Henry Erickson, and Howard G. Russell

It is certified that error appears in the above-identified patent and that said Letters Patent are hereby corrected as shown below:

Claim 15, line 1,

"4" should read --14--.

SIGNED AND
SEALED

JUL 21 1970

(SEAL)
Attest:

Edward M. Fletcher, Jr.
Attesting Officer

WILLIAM E. SCHUYLER, JR.
Commissioner of Patents